May 19, 1925. Re. 16,075
A. ALDRICH
PAPER MAKING MACHINE
Original Filed July 16, 1921 3 Sheets-Sheet 1
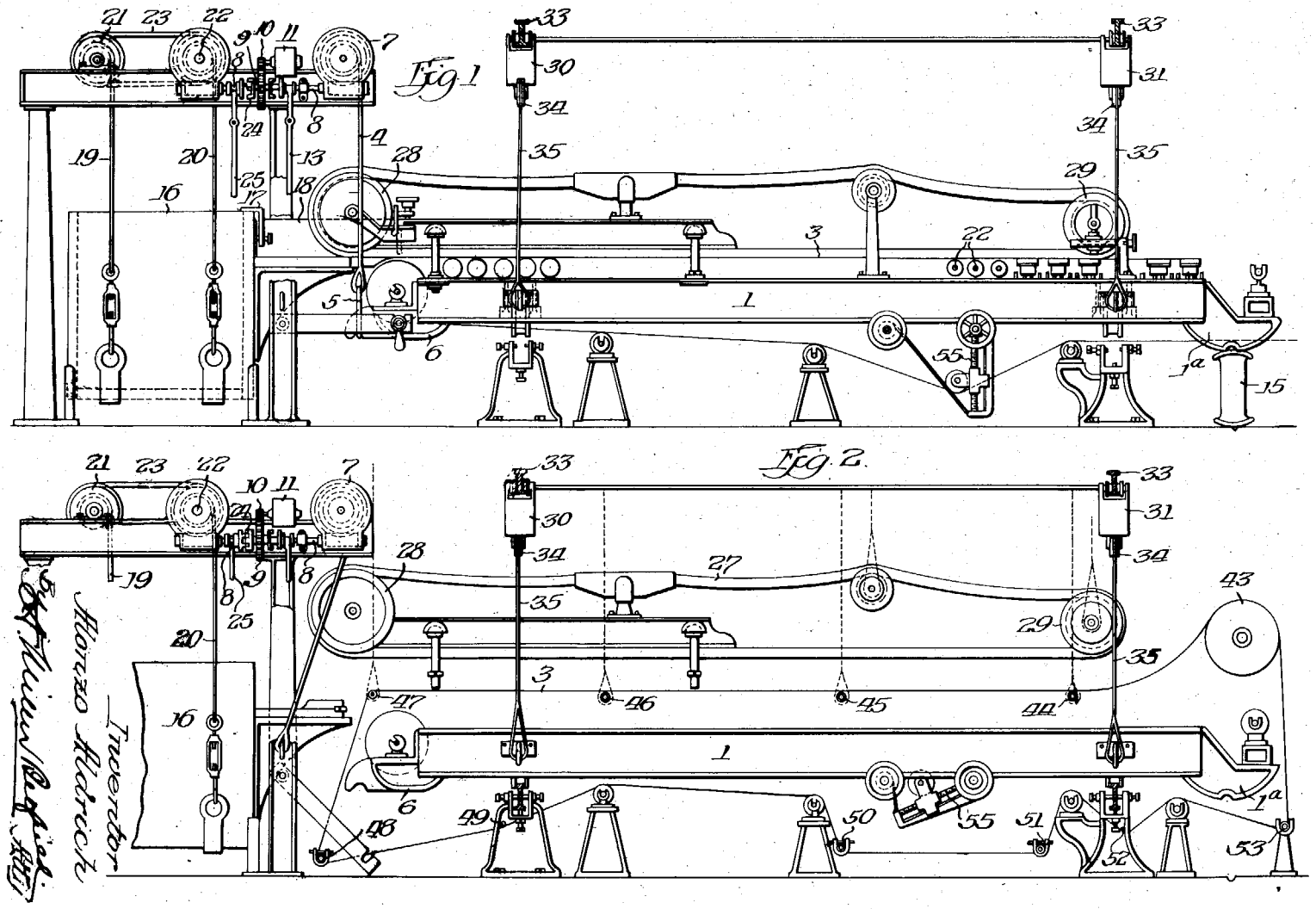

May 19, 1925. Re. 16,075
A. ALDRICH
PAPER MAKING MACHINE
Original Filed July 16, 1921 3 Sheets-Sheet 2
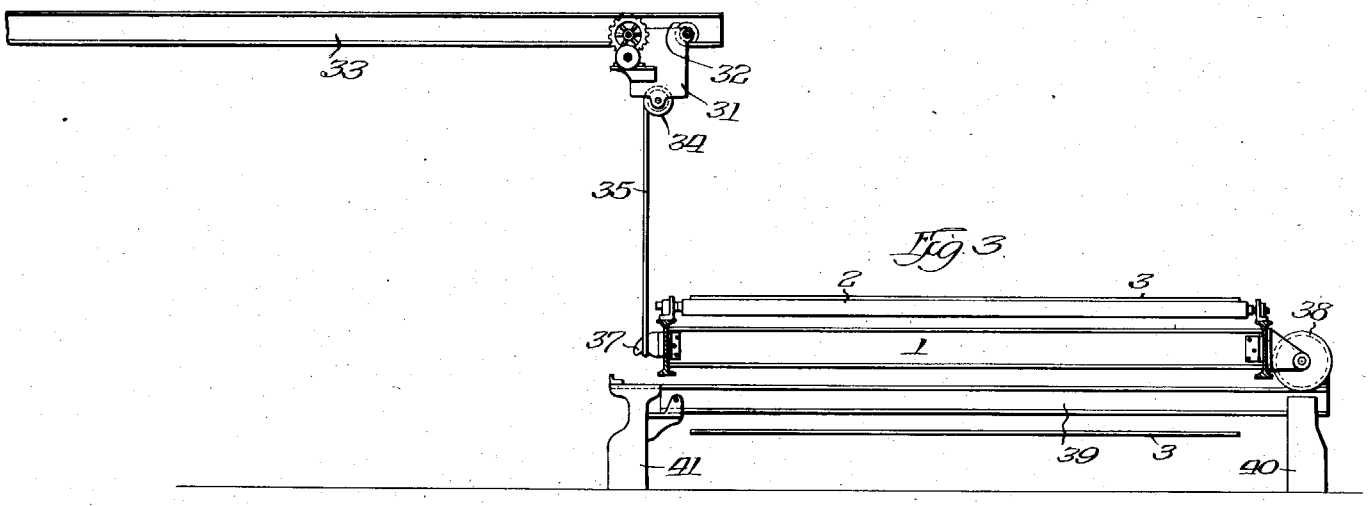
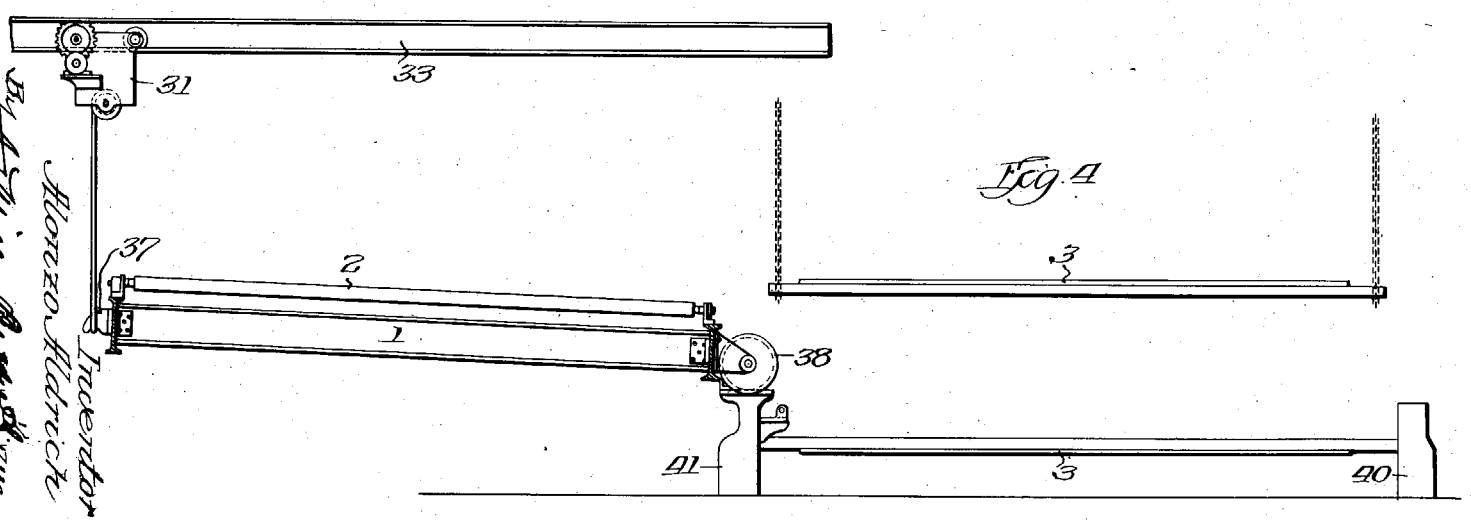
Inventor
Alonzo Aldrich
By A. Miller Bergen Atty May 19, 1925. Re. 16,075

A. ALDRICH

PAPER MAKING MACHINE

Original Filed July 16, 1921 3 Sheets-Sheet 3

Inventor
Alonzo Aldrich
By A. Milton Deffield Atty.

Reissued May 19, 1925.

Re. 16,075

UNITED STATES PATENT OFFICE.

ALONZO ALDRICH, OF BELOIT, WISCONSIN, ASSIGNOR TO BELOIT IRON WORKS, OF BELOIT, WISCONSIN, A CORPORATION OF WISCONSIN.

PAPER-MAKING MACHINE.

Original No. 1,421,754, dated July 4, 1922, Serial No. 485,180, filed July 16, 1921. Application for reissue filed October 17, 1923. Serial No. 669,187.

*To all whom it may concern:*

Be it known that I, ALONZO ALDRICH, a citizen of the United States, residing at Beloit, in the county of Rock and State of Wisconsin, have invented a certain new and useful Improvement in Paper-Making Machines, of which the following is a full, clear, concise, and exact description, reference being had to the accompanying drawings, forming a part of this specification.

My invention relates to paper making machines, and particularly to machines known in the trade as Fourdrinier machines.

One of the objects of the invention is to provide a practical and advantageous construction of Fourdrinier machine.

Another object of the invention is to arrange for the quick and ready placing of a new wire in the machine, after the old wire has been ripped or torn off.

Another object of the invention is to simplify the construction so that the operation of placing a new wire in the machine will involve a minimum amount of changing of the parts and labor.

In the accompanying drawings Fig. 1 is a side elevation of a portion of a Fourdrinier machine embodying my present invention and in operating condition with a wire in place;

Fig. 2 is a similar view of said machine in the process of inserting a new wire;

Fig. 3 is an end elevation of the machine at the beginning of the process of changing a wire;

Fig. 4 is a view similar to Fig. 3 with the new wire being put in place; and

Figure 5:
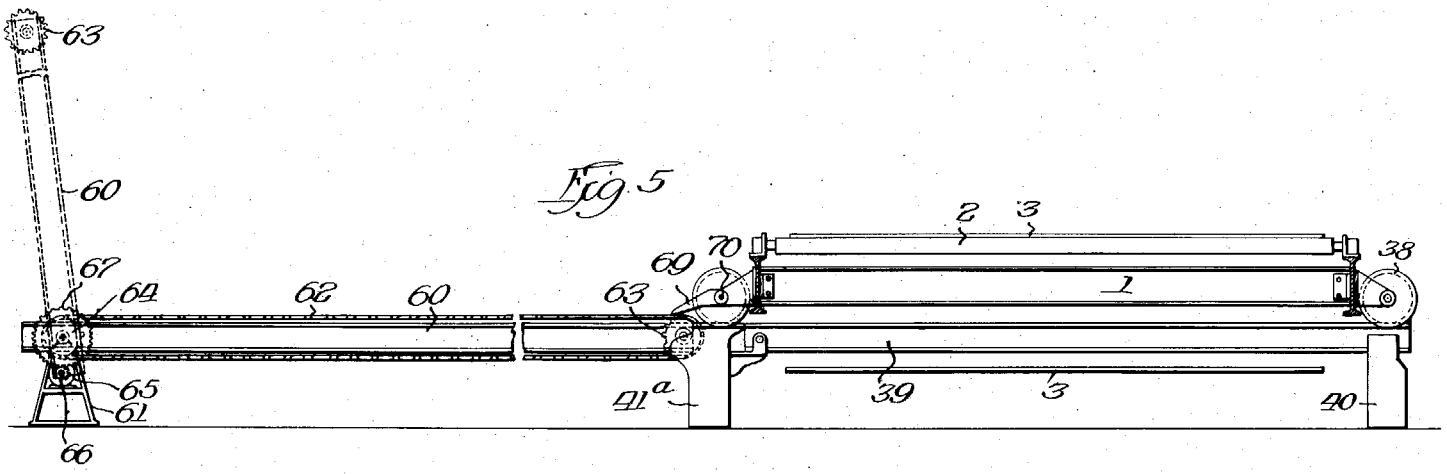
Figs. 5 and 6 are views similar to Figs. 3 and 4, respectively, of a modified form of machine.

Referring to the drawings, and particularly to Figs. 1 to 4, inclusive, I show a machine having a table 1 provided with rolls 2—2 supporting a wire 3. The feed end of the table is supported by cables 4 having couplings 5 engaging brackets 6. The cables 4 extend up over winding drums 7 which are actuated by rotary shaft 8 driven by gears 9 and 10 from electric motor 11. A clutch 12 controlled by a lever 13 permits the control of the motor 11 so as to operate the winding drums 7 and thereby raise or lower the feed end of the table 1 as desired.

The other end 1ª of the table is supported on a rocker 15 by which a slight extent of movement of the table is permitted as required by the raising and lowering of the feed end. The table may be shaken if desired by connecting suitable shaking mechanism, as for example, a bell-crank and operating means connected to one side of the table near the feed end. As such mechanism is well known in the art, it is not shown here.

The head box 16 is also arranged to be raised and lowered and is shown connected by a clamp 17 with the side pieces 18 on the table 1. Cables 19 and 20 are shown connected with the head box 16 and these cables are shown extending up over winding drums 21 and 22, respectively. The frame 21 is operated by a belt 23 running to the drum 22 and the latter is operated by means of shaft 8 and clutch 24 thereon controlled by a lever 25, whereby operation of lever 25 may throw clutch 24 into engagement with shaft 8 and thereby cause motor 7 to elevate head box 16. For adjusting the pitch of the table 1, the feed end thereof and the head box 16 are raised and lowered as desired by operating levers 13 and 25.

The deckle straps 27 are shown running over deckle wheels 28 and 29 at or near the opposite ends of the table.

In order to permit the placing of a new wire on the machine, the table 1 is arranged to be run out bodily in a lateral direction so that it may be placed in front of the position it usually occupies so as to permit the new wire to be stretched and placed in the usual position around the space normally occupied by the table, after which the table may be moved back into its normal position, passing between the upper and lower plies or reaches of the wire so that operation may be resumed with the wire in its proper place above and below the table.

In accordance with the present invention, provision is made for lifting and moving forward the front edge of the table and for supporting and permitting the forward movement of the rear edge of the table. To such end I show overhead traveling, lifting and pulling units 30 and 31, conveniently in the form of overhead trolley devices having trolley wheels 32—32 running on overhead tracks 33, said units 31 also having winding drums 34 adapted to wind cables 35, the units 30 and 31 being provided with mechanism preferably in the form of electric motor devices for rotating the wheels 32 to cause movement along the track 33 and being also provided with mechanism, preferably electric motor devices, for rotating wheels 34 to cause winding and unwinding of the cables 35. Thus the cables 35—35 may be engaged with the front edge of the table 1 as by passing them over noses 37 on the table, and by operating the winding drums 34 the front edge of the table may be elevated slightly, as shown in Fig. 3. Then by rotating the wheels 32 the units 30 and 31 may be moved so as to pull the front edge of the table forwardly as shown in Fig. 4.

To permit the proper travel of the rear edge of the table during its forward movement, said rear edge is provided with wheels 38, and tracks 39 are mounted on pedestals 40 and 41, whereby the wheels 38 will travel along the rails 39 as the table moves forwardly. These rails 39 are understood not to be in position in the machine normally, but are to be inserted (as shown in Fig. 3), when it is intended to move the table to permit insertion of a new wire.

In order to put a new wire in place in the machine, the old wire is removed as by ripping or tearing it off from the table. The cables 35 are connected with the front edge of the machine, the lifting and pulling units 30 and 21 being located above said front edge, as seen in Fig. 3. The table is then disconnected from the head box 16 by removing clamp 17 and the cable 4 unhooked. The lifting and pulling units 31 are then operated so as to elevate the front edge or side of the table a slight extent, as shown in Fig. 3, and are then further operated so as to pull the table outwardly or forwardly to a fully removed position, as seen in Fig. 4. The deckel strap 27 and wheels 28 have been previously elevated, as shown in Fig. 2, so as to permit this movement of the table.

The couch roll 43 is lifted from its bearing and the new wire slipped over it and the couch roll then elevated. The new wire is then extended along the machine between the supports or foundations of the table. Pipes such as 44, 45, 46 and 47 (Fig. 2) are inserted below the upper ply or reach of the new wire so as to support the same in a lifted position. Other pipes such as 48, 49, 50, 52 and 53 are placed over the lower stretch of the new wire so as to hold the same down. These latter pipes are so placed as to make space for the various projecting parts of the table, such as the brackets 6 and 1ª, and the tension device 55. The table is then moved back to its normal position by operating the units 30 and 31, the wheels 38 traveling on the rails 39 and the front edge of the table being supported and moved by the movement of the units 30 and 31 when the table is moved back. Its front edge is lowered and its feed end is engaged and lifted by the cables 4, the rails 39 are removed, the couch 43 and other parts are put back in position and the machine is ready for operation with its new wire.

It will be seen that this operation can be quickly and readily performed; and that only one set of rails 39 is necessary, the front edge of the table being supported and moved by other mechanism.

Figure 6:
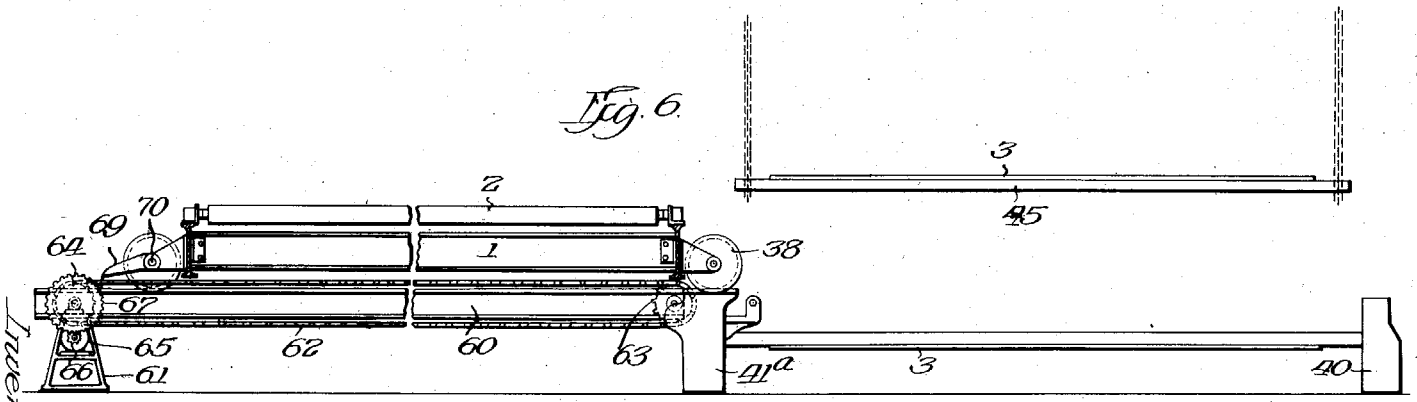

Referring to the modification shown in Figs. 5 and 6, I show an arrangement by which the table 1 can be moved laterally by power means located at one side of the table, but not above the same. In this modification I show tracks or rails 60, at one side of the normal position of the table 1, the same being preferably supported by posts 41ª and 61. An endless chain 62 is arranged in connection with one set of tracks 60, traveling over sprocket wheels 63 and 64 at the opposite ends of said tracks. A power generator 65, which may be an electric motor, is shown mounted on the post 61 and connected by pinion 66 and gear 67 with the sprocket 64, so that said chain 62 may be operated by the motor 65.

The table 1 is provided with a hook member 69 which is adapted to engage the upper stretch of the chain 62. Thus by engaging the hooked member 69 with the chain 62, the table 1 may be run out to one side of its normal position, as shown in Fig. 6. When this is done the tracks 39 may be removed so as to permit the new wire to be extended along between the posts 40 and 41ª, as previously explained in connection with the form of machine illustrated in Figs. 1 to 4, inclusive. When the wire is thus properly arranged, the table 1 may be returned to its normal position, by reversing the motor 65 and causing the chain 62 to move in a reversed manner and thereby push the table back to its normal position.

In order that the rails 60 may be moved and kept normally out of the way, said rails are preferably pivoted to the posts 61 so that they may be swung upwardly as shown in dotted lines in Fig. 5.

Reference is made to application Serial No. 469,552, filed May 14, 1921, in the name of myself and A. L. Larson, for paper making machines, said application disclosing and claiming certain of the broad features of construction and operation set forth in this application.

It will be understood that changes and modifications may be made without departing from the spirit of the invention.

What I claim as new is:

1. In a machine of the class specified, the combination of a laterally movable table, and overhead means for lifting the front edge of the table and moving the table laterally.

2. In a machine of the class specified, the combination of a laterally movable table, and overhead means for drawing the table out to one side.

3. In a machine of the class specified, the combination of a laterally movable table, overhead means for engaging and drawing upon the front edge of the table, and means for supporting and permitting the forward and backward travel of the rear edge of the table.

4. The combination with a laterally movable table, of power means separated from the table and flexible connectors between the power means and the table for moving the table out to one side.

5. The combination of a laterally movable table, rails below the table, wheels on the rear of the table arranged to travel on said rails, means for lifting the front edge of the table, and means for moving the table with its front edge elevated and its rear edge traveling on said rails.

6. The combination of a laterally movable table, rails below said table, wheels on the rear edge of the table for traveling on said rails, and pulling means connected to and supporting the front edge of the table for moving the table laterally.

7. The combination of a laterally movable table, rails below said table, wheels on the rear edge of the table for traveling on said rails, and lifting and pulling means for elevating and lowering the front edge of the table and moving the table laterally.

8. The combination of a laterally movable table, rails below said table, wheels on the rear edge of the table for traveling on said rails, and lifting and pulling means for elevating and lowering the front edge of the table and moving the table laterally, said lifting and pulling means comprising overhead lifting and pulling units arranged to travel on overhead rails, and provided with lifting and propelling mechanism.

9. The combination of a laterally movable table, means for permitting the lateral movement of the table and power means in front of the table connected with the same for supporting and moving the table.

10. The combination of a laterally movable table, means for permitting the lateral movement of the table, flexible means connected with the table and extended in front of the same and a power generator in front of the table connected with said flexible means for moving and supporting the table.

11. The combination with a table mounted for sidewise shaking movement and also mounted to permit bodily elevation, of means for elevating the front edge of the table and means permitting the sidewise or lateral movement of the table.

12. The combination of a table mounted for sidewise shaking movement and also mounted for bodily elevation, means for raising and lowering the feed end of the table, tracks extending sidewise of the table on which the same may be moved laterally and means for lifting one side or edge of the table and moving the same laterally.

13. The combination of a table mounted for sidewise shaking movement and also mounted for bodily elevation, means for raising and lowering the feed end of the table, laterally extending tracks extending sidewise on which the table may be moved laterally, and means for lifting one side or edge of the table and moving the same laterally, said last mentioned means comprising overhead lifting and pulling units connected with said edge or side of the table and overhead tracks on which said pulling units operate.

14. The combination of a table mounted for sidewise shaking movement and also mounted for bodily elevation, means for raising and lowering the feed end of the table, laterally extending tracks extending sidewise on which the table may be moved laterally and means for lifting one side or edge of the table and moving the same laterally, said last mentioned means comprising overhead lifting and pulling units connected with said edge or side of the table and overhead tracks on which said pulling units operate, a vertically adjusted head box and means for raising and lowering said head box.

15. The combination of a table mounted for sidewise shaking movement and also mounted for bodily elevation, means for raising and lowering the feed end of the table, laterally extending tracks extending sidewise on which the table may be moved laterally and means for lifting one side or edge of the table and moving the same laterally, said last mentioned means comprising overhead lifting and pulling units connected with said edge or side of the table and overhead tracks on which said pulling units operate, a vertically adjusted head box and means for raising and lowering said head box, said means for raising and lowering the table feed end and the head box comprising an electric motor, winding drums and clutch arrangements for connecting said motor with said winding drums.

16. The combination with the laterally movable table, of laterally extending tracks on which the table may be moved, a flexible connector on said side tracks, means for connecting and disconnecting the table with said flexible connector and a power generator also on said side tracks for moving said flexible connector, and means for swinging said laterally extending tracks upwardly about their outer ends as pivots.

17. The combination with the laterally movable table of laterally extending tracks on which the table may be moved, a flexible connector on said side tracks, means for connecting and disconnecting the table with said flexible connector, a power generator also on said side tracks for moving said flexible connector, and means for swinging said laterally extending tracks upwardly about their outer ends as pivots.

18. A Fourdrinier machine having a table laterally removable in its entirety and shakable in its entirety.

19. A Fourdrinier machine having a laterally removable and shakable table combined with power means attached to the table for removing said table.

20. A Fourdrinier machine having a laterally removable table mounted for vertical adjustment to permit varying the pitch of the wire as desired.

21. A Fourdrinier machine having a laterally removable table mounted for vertical adjustment to vary the pitch of the wire as desired in combination with power means attached to the table for removing same and power means for effecting said vertical adjustment.

22. A Fourdrinier machine having a laterally removable and shakable table mounted for vertical adjustment to permit varying the pitch of the wire as desired.

23. A Fourdrinier machine having a laterally removable and shakable table mounted for vertical adjustment to permit varying the pitch of the wire as desired combined with power means attached to the table for laterally removing the same.

24. A Fourdrinier machine having a laterally removable and shakable table mounted for vertical adjustment to permit varying the pitch of the wire as desired, in combination with power means for effecting such vertical adjustment of the table.

25. A Fourdrinier machine having a laterally removable and shakable table mounted for vertical adjustment to permit varying the wire pitch in combination with power means adapted for attachment to the table for laterally removing the same and power means for effecting said vertical adjustment.

26. A Fourdrinier machine having a laterally removable and shakable table mounted for vertical adjustment to permit varying the wire pitch and means for removing the table adapted to permit shaking the table and means for effecting said vertical adjustment.

27. A Fourdrinier machine having a laterally removable and shakable table mounted for vertical adjustment to permit variation of the wire pitch and means for effecting such vertical adjustment, said means being adapted to permit the removal and shaking of the table.

28. The combination with a laterally removable table of overhead means for lifting the feed end of the same.

29. The combination with a laterally removable table of means for lifting the feed end of the same, and means for also lifting the head box.

30. The combination of a laterally removable table mounted for sidewise shaking movement, overhead means for elevating said table to permit variation in wire pitch and tracks on which the table can be moved laterally.

31. In a machine of the class specified, the combination with a laterally removable table of means for elevating one end of the table, tracks upon which the table can move and means on the table for permitting the table to move on the tracks.

32. In a machine of the class specified, the combination with means for elevating one end of the table, of tracks upon which the table can move, means on the table for permitting the table to travel on said tracks and power means for moving the table upon the tracks.

33. A Fourdrinier machine having a laterally removable and shakable table having its feed end mounted for vertical adjustment to vary the pitch of the wire.

34. The combination of a Fourdrinier table having its feed end vertically adjustable, means for lifting said feed end, wheels on the table, transversely extending tracks on which the wheels may travel and an electric motor for moving the table on said tracks.

35. A Fourdrinier machine having a laterally removable and shakable table having its feed end mounted for vertical adjustment to vary the pitch of the wire, and power means for raising and lowering said vertically adjustable end of the table.

36. The combination of a vertically adjustable Fourdrinier table, means for lifting the feed end of the same without lifting the other end, said means comprising a flexible connector connected to the free end and means for winding the same, tracks on which the table may be moved laterally and wheels on the table for traveling on said tracks.

37. A Fourdrinier machine having a laterally removable and shakable table having its feed end mounted for vertical adjustment to vary the pitch of the wire, and power means for raising and lowering said vertically adjustable end of the table, and a post at the other end of the table forming a rocker for permitting the raising and lowering of the feed end of the table.

38. A Fourdrinier machine having a laterally removable and shakable table having its feed end mounted for vertical adjustment to vary the pitch of the wire, and power means for raising and lowering said vertically adjustable end of the table, and a post at the other end of the table forming a rocker for permitting the raising and lowering of the feed end of the table, said table being also mounted for vertical elevation to lift it from said rocker to permit bodily lateral removal.

39. A Fourdrinier machine having a laterally removable table mounted for vertical adjustment to permit varying the wire pitch and means for laterally moving said table adapted to permit such vertical adjustment.

40. A Fourdrinier machine having a laterally removable table, whose feed end is mounted for vertical adjustment to permit variation of the wire pitch.

41. A Fourdrinier machine having a laterally removable and vertically adjustable table, and also having paper material holding and feeding devices vertically adjustable to cooperate with the table.

42. A Fourdrinier machine having a laterally removable and vertically adjustable table and also having paper material holding and feeding devices vertically adjustable to cooperate with the table, and means for adjusting said last mentioned devices.

43. A Fourdrinier machine having a laterally removable and vertically adjustable table and also having paper material holding and feeding devices vertically adjustable to cooperate with the table, and means for adjusting said last mentioned devices, said last means being arranged to operate in conjunction with the table adjusting means so that the table and feed devices will be raised and lowered together.

44. A Fourdrinier machine having a laterally removable table having its feed end mounted for vertical adjustment to permit variation in the wire pitch and also mounted for horizontal shaking movement.

45. A Fourdrinier machine having a laterally removable and vertically adjustable table, and also having paper material holding and feeding devices vertically adjustable to cooperate with the table, and means for laterally removing the table adapted to permit adjustment thereof and of the paper material holding and feeding devices.

46. A Fourdrinier machine having a laterally removable and vertically adjustable table, and also having paper material holding and feeding devices vertically adjustable to cooperate with the table and means for adjusting the table and paper material holding and feeding devices adapted to permit removal of the table.

47. A Fourdrinier machine having a laterally removable and vertically adjustable table and also having vertically adjustable paper holding and feeding devices and means for raising and lowering said table and said devices in unison.

48. A Fourdrinier machine having a laterally removable and vertically adjustable table and also having vertically adjustable paper holding and feeding devices and means for raising and lowering said table and said devices in unison, said means being adapted for connection with and disconnection from the table to permit lateral removal of same.

49. A Fourdrinier machine having a laterally removable and vertically adjustable table, means for removing the table and adjusting means for vertically adjusting the feed end of the table, said means being detachably connected with the table.

50. A Fourdrinier machine having a laterally removable and vertically adjustable table, means for removing the table and adjusting means for vertically adjusting the feed end of the table, said means being detachably connected with the table and comprising vertically adjustable members and means for elevating and lowering the same.

51. A Fourdrinier machine having a laterally removable and vertically adjustable table, means for removing the table and adjusting means for vertically adjusting the feed end of the table, said means being detachably connected with the table and comprising vertically adjustable members and means for elevating and lowering the same, and means for vertically adjusting the paper material holding and feeding devices.

52. A Fourdrinier machine having a laterally removable and vertically adjustable table, and also having vertically adjustable paper material holding and feeding devices and means for adjusting said table and paper material holding and feeding devices vertically in unison, said means comprising a power generator and connections between the same and said raising and lowering means.

53. A Fourdrinier machine having a laterally removable, shakable and vertically adjustable table, and also having paper material holding and feeding devices vertically adjustable to cooperate with the table, and means for laterally removing the table adapted to permit adjustment thereof and of the paper material holding and feeding devices.

54. A Fourdrinier machine having a laterally removable, shakable and vertically adjustable table, and also having paper material holding and feeding devices vertically adjustable to cooperate with the table, and means for adjusting the table and paper material holding and feeding devices adapted to permit removal of the table.

55. A Fourdrinier machine having a laterally removable shakable and vertically adjustable table, and also having vertically adjustable paper material holding and feeding devices, and means for raising and lowering said table and said devices in unison.

56. A Fourdrinier machine having a laterally removable, shakable and vertically adjustable table and also having vertically adjustable paper holding and feeding devices, and means for raising and lowering said table and said devices in unison, said means being adapted for connection with and disconnection from the table to permit lateral removal of same.

57. A Fourdrinier machine having a laterally removable, shakable and vertically adjustable table, means for removing the table and adjusting means for vertically adjusting the feed end of the table, said means being detachably connected with the table.

58. A Fourdrinier machine having a laterally removable, shakable and vertically adjustable table, means for removing the table and adjusting means for vertically adjusting the feed end of the table, said means being detachably connected with the table and comprising vertically adjustable members, and means for elevating and lowering the same.

59. A Fourdrinier machine having a laterally removable, shakable and vertically adjustable table, means for removing the table and adjusting means for vertically adjusting the feed end of the table, said means being detachably connected with the table and comprising vertically adjustable members, means for elevating and lowering the same, and means for vertically adjusting the paper material holding and feeding devices.

60. A Fourdrinier machine having a laterally removable, shakable and vertically adjustable table, and also having vertically adjustable paper material holding and feeding devices and means for adjusting said table and paper material holding and feeding devices vertically in unison, said means comprising a power generator and connections between the same and said raising and lowering mechanism.

61. A Fourdrinier machine having a laterally removable table mounted to permit vertical adjustment of its feed end to secure variation in the wire pitch, and raising and lowering means adapted for connection and disconnection with the feed end of the table to secure such vertical adjustment when connected and to permit removal of the table when disconnected.

62. A Fourdrinier machine having a laterally removable table mounted to permit vertical adjustment of its feed end to secure variation in the wire pitch, and raising and lowering means adapted for connection and disconnection with the feed end of the table to secure such vertical adjustment when connected and to permit removal of the table when disconnected and a rocker support for the other end of the table, said support being adapted to permit such vertical adjusting movement of the feed end of the table and the table being mounted detachably upon said support to permit removal of the table.

63. A Fourdrinier machine having a laterally removable table mounted to permit vertical adjustment of its feed end to secure variation in the wire pitch, and raising and lowering means adapted for connection and disconnection with the feed end of the table to secure such vertical adjustment when connected and to permit removal of the table when disconnected, in combination with paper material holding and feeding devices mounted for vertical adjustment in accordance with the vertical adjustment of the feed end of the table, means for connecting and disconnecting said paper material holding and feeding devices to the feed end of the table and disconnecting the same therefrom so as to permit said feed devices to rise and fall with the table and also to permit removal of the table without removing said devices and means for raising and lowering said devices.

64. A Fourdrinier machine having a laterally removable table mounted to permit vertical adjustment of its feed end to secure variation in the wire pitch, and raising and lowering means adapted for connection and disconnection with the feed end of the table to secure such vertical adjustment when connected and to permit removal of the table when disconnected, in combination with paper material holding and feeding devices mounted for vertical adjustment in accordance with the vertical adjustment of the feed end of the table, means for connecting and disconnecting said paper material holding and feeding devices through the feed end of the table and disconnecting the same therefrom so as to permit said feed devices to rise and fall with the table and also to permit removal of the table without removing said devices and means for raising and lowering said devices, the means for raising and lowering the feed end of the table comprising flexible connectors detachably connected to the feed end of the table and the means for raising and lowering said devices comprising flexible connectors detachably connected with said devices in combination with windles and power mechanism for turning said windles to wind and unwind said connectors.

65. A Fourdrinier machine having a laterally removable table having its feed end mounted for vertical adjustment to secure variation in the wire pitch, said table carrying the table and breast rolls which are mounted thereon so as to be removable in their normal positions with the table and means for raising and lowering the feed end of the table.

66. A Fourdrinier machine having a laterally removable table having its feed end mounted for vertical adjustment to secure variation in the wire pitch, said table carrying the table and breast rolls which are mounted thereon so as to be removable in their normal positions with the table and means for raising and lowering the feed end of the table, said breast roll being mounted on the table between the point of connection of said raising and lowering means and the table rolls.

In witness whereof I hereunto subscribe my name this 21st day of September, 1923.

ALONZO ALDRICH.